United States Patent
Held et al.

(10) Patent No.: US 11,428,607 B2
(45) Date of Patent: Aug. 30, 2022

(54) STATION FOR CHECKING TYRES CONFIGURED FOR OVERTURNING TYRES PERPENDICULAR TO A TYRE ROTATION AXIS

(71) Applicant: PIRELLI TYRE S.P.A., Milan (IT)

(72) Inventors: Alessandro Held, Milan (IT); Christian De Col, Milan (IT); Albert Berenguer, Milan (IT); Vincenzo Boffa, Milan (IT); Cristian Di Felice, Ascoli Piceno (IT)

(73) Assignee: PIRELLI TYRE S.P.A., Milan (IT)

( * ) Notice: Subject to any disclaimer, the term of this patent is extended or adjusted under 35 U.S.C. 154(b) by 160 days.

(21) Appl. No.: 16/772,758

(22) PCT Filed: Dec. 19, 2018

(86) PCT No.: PCT/IB2018/060339
§ 371 (c)(1),
(2) Date: Jun. 12, 2020

(87) PCT Pub. No.: WO2019/123313
PCT Pub. Date: Jun. 27, 2019

(65) Prior Publication Data
US 2020/0340885 A1    Oct. 29, 2020

(30) Foreign Application Priority Data
Dec. 20, 2017   (IT) ........................ 102017000147485

(51) Int. Cl.
*G01M 17/02* (2006.01)
*B60C 25/00* (2006.01)

(52) U.S. Cl.
CPC ......... *G01M 17/021* (2013.01); *B60C 25/005* (2013.01)

(58) Field of Classification Search
CPC ..... B60C 25/002; B60C 25/005; B60C 25/00; B60C 25/05; B60C 25/0554
See application file for complete search history.

(56) References Cited

U.S. PATENT DOCUMENTS

| | | | | |
|---|---|---|---|---|
| 3,969,627 A | * | 7/1976 | Heisner ................. | G01N 23/18 378/61 |
| 6,124,925 A | | 9/2000 | Kaneko et al. | |

(Continued)

FOREIGN PATENT DOCUMENTS

| | | |
|---|---|---|
| CN | 101245987 A | 8/2008 |
| CN | 105074414 A | 11/2015 |

(Continued)

OTHER PUBLICATIONS

International Search Report for International Application No. PCT/IB2018/060339 filed on Dec. 19, 2018 on behalf of Pirelli Tyre SPA, dated Mar. 19, 2019. 5 pages.

(Continued)

*Primary Examiner* — Eric S. McCall
*Assistant Examiner* — Timothy P Graves
(74) *Attorney, Agent, or Firm* — Steinfl + Bruno LLP (57) ABSTRACT

A station for checking tyres includes a support structure defining an operating space for receiving a tyre and an overturning device with grip elements for engaging a radially outer portion of the tyre. A checking device includes a mechanical arm and at least one sensor associated with the mechanical arm. The overturning device overturns the tyre around an overturning axis perpendicular to a rotation axis of the tyre when the tyre is in the operating space. The mechanical arm is operatively active within the operating space and carries the sensor at least partially within the tyre for executing checks on an inner surface of the tyre housed in the operating space.

20 Claims, 8 Drawing Sheets

(56) References Cited

U.S. PATENT DOCUMENTS

| | | | |
|---|---|---|---|
| 6,269,689 | B1 | 8/2001 | Alexander |
| 9,719,944 | B2 | 8/2017 | Boffa et al. |
| 2005/0229702 | A1* | 10/2005 | Haydu .................. G01M 1/045 |
| | | | 301/5.21 |
| 2008/0202229 | A1 | 8/2008 | Maehner et al. |
| 2012/0042724 | A1 | 2/2012 | Lipponer et al. |
| 2013/0340515 | A1 | 12/2013 | Steinbichler et al. |
| 2014/0373614 | A1 | 12/2014 | Steinbichler et al. |
| 2016/0225128 | A1* | 8/2016 | Krolczyk ................ G06T 7/001 |
| 2016/0305851 | A1* | 10/2016 | Boffa .................. G01M 17/024 |
| 2017/0016805 | A1 | 1/2017 | Maruoka et al. |

FOREIGN PATENT DOCUMENTS

| | | |
|---|---|---|
| CN | 105378447 A | 3/2016 |
| CN | 105612415 A | 5/2016 |
| CN | 105745524 A | 7/2016 |
| CN | 107209084 A | 9/2017 |
| DE | 102006053161 A1 | 5/2008 |
| DE | 102007009040 B3 | 5/2008 |
| DE | 102008037356 A1 | 3/2010 |
| JP | 2006242737 A | 9/2006 |
| JP | 2012042472 A | 3/2012 |
| KR | 100892970 B1 | 4/2009 |
| WO | 2014/145258 A1 | 9/2014 |
| WO | 2015/079370 A1 | 6/2015 |
| WO | 2016/088040 A2 | 6/2016 |
| WO | 2016/088040 A9 | 6/2016 |
| WO | 2017/103871 A1 | 6/2017 |

OTHER PUBLICATIONS

Written Opinion for International Application No. PCT/IB2018/060339 filed on Dec. 19, 2018 on behalf of Pirelli Tyre SPA, dated Mar. 19, 2019. 6 pages.

Cai, Z., "Design of Tire Inspection System Based on X-ray," Computer Knowledge and Technology, vol. 9 Issue 03, Jan. 25, 2013. pp. 629-632. (Original + English Translation). 12 Pages.

First Chinese Office Action issued for CN Application No. 201880082226.7 filed on Dec. 19, 2018, on behalf of Pirelli Tyre SPA, dated Jan. 26, 2022. Chinese Original and English Translation. 29 Pages.

International Preliminary Report on Patentability Issued for International Application No. PCT/IB2018/060339 filed on Dec. 19, 2018, on behalf of Pirelli Tyre SPA, dated Jun. 23, 2020. 7 Pages.

* cited by examiner

STATION FOR CHECKING TYRES CONFIGURED FOR OVERTURNING TYRES PERPENDICULAR TO A TYRE ROTATION AXIS

CROSS REFERENCE TO RELATED APPLICATIONS

The present application is the U.S. National Stage of International Patent Application No. PCT/IB2018/060339 filed on Dec. 19, 2018 which, in turn, claims priority to Italian Application No. IT 102017000147485 filed on Dec. 20, 2017.

TECHNICAL FIELD OF THE INVENTION

The present invention relates to a method and a station for checking tyres.

The present invention preferably falls within the field of processes and apparatuses for building tyres for vehicle wheels.

In particular, the present invention falls within the scope of quality checks carried out on preferably moulded and vulcanised tyres, adapted to verify the compliance thereof with the project specifications and therefore allow the compliant ones to be sent to storage and the defective ones to be discarded.

A tyre for vehicle wheels generally comprises a carcass structure comprising at least one carcass ply having end flaps engaged with respective annular anchoring structures. A belt structure is associated in a radially outer position to the carcass structure, comprising one or more belt layers, arranged in radial superposition with respect to each other and with respect to the carcass ply, having textile or metallic reinforcing cords with crossed orientation and/or substantially parallel to the circumferential development direction of the tyre. A tread band is applied in a position radially outer to the belt structure, also made of elastomeric material like other semi-finished products making up the tyre. The assembly of at least said belt structure and said tread band form the crown structure of the tyre. Respective sidewalls of elastomeric material are further applied on the lateral surfaces of the carcass structure, each extending from one of the lateral edges of the tread band up at the respective annular anchoring structure to the beads. In "tubeless" tyres, the carcass ply is internally coated by a preferably butyl-based layer of elastomeric material, usually called "liner" having optimal airtight characteristics and extending from one to the other of the beads.

The production cycles of a tyre provide for a building process in which the various structural components of the tyre itself are made and/or assembled on one or more drums. The built green tyres are transferred to a moulding and vulcanisation line where a moulding and vulcanisation process is carried out to define the structure of the tyre according to a desired geometry and tread pattern.

Preferably after vulcanisation, the tyres are subjected to quality checks in order to check for any defects.

DEFINITIONS

By the term "check" referring to tyres we generally mean all those non-destructive operations that allow detecting any external (on radially outer and/or radially inner surfaces) and/or internal (within the structure) defects of the tyre. Said checks may, for example, be of the optical type (photography, shearography, holography, radiography, etc.), ultrasound or mechanical or a combination thereof.

By "high definition check" of the tyre it is meant a check having a definition in each spatial direction (for example of a Cartesian triad) smaller than or equal to 0.05 mm, preferably smaller than or equal to 0.01 mm.

By "low definition check" it is meant a check having a definition in each spatial direction (for example of a Cartesian triad) greater than 0.05 mm, preferably greater than or equal to 0.1 mm, more preferably comprised between about 0.3 mm and about 5 mm.

The terms "lower", "higher", "low", "high", "below" and "above" identify the relative position of an element, such as a component of a tyre, a tyre, an apparatus, a device, etc., with respect to the ground or of one of said elements with respect to another element.

"Rotation axis of the tyre" means the axis around which the tyre rotates when it is operating, i.e. installed on a vehicle and rolls on the road.

The terms "radial" and "axial" and the expressions "radially inner/outer" and "axially inner/outer" are used referring to a direction perpendicular and a direction parallel to the rotation axis of the tyre, respectively.

A plane is defined as "radial" when it includes the rotation axis of the tyre.

The term "symmetry plane of the tyre" (unless there are differences due to the tread pattern) indicates the plane orthogonal to the rotation axis of the tyre and equidistant from the beads of the tyre itself.

The terms "circumferential" and "circumferentially" are instead used with reference to the annular development direction of the tyre.

The term "half of the tyre" refers to the axial halves of the tyre, i.e. the halves delimited by the symmetry plane.

"At least one half of the tyre" means a complete half as defined above plus, possibly, a further portion of the other half extending axially starting from the aforementioned symmetry plane.

By "outer surface" or "inner surface" of the tyre or portions thereof it is meant the surface intended to remain visible after the coupling of the tyre with its own mounting rim and the one intended to be no longer visible after said coupling, respectively. The inner and outer surface delimit the tyre.

"Interior of the tyre" or "inner volume of the tyre" means the space which is no longer visible after the coupling of the tyre with its own mounting rim.

PRIOR ART

Document WO2016/088040, on behalf of the same Applicant, illustrates a method and an apparatus for checking tyres. The apparatus comprises a first check unit having an inlet for the tyres and comprising a plurality of checking tools; a second check unit having an outlet for the tyres and comprising a plurality of checking tools; an overturning and transport device operatively interposed between the first check unit and the second check unit. The first check unit, the second check unit and the overturning and transport device define a check path configured so as to be traversed by pitches by each tyre. The first check unit and the second check unit comprise the same checking tools configured for performing the same checks on respective axial halves of the tyres.

Document DE102008037356 illustrates a system for testing tyres for quality control purposes and for reducing safety risks. These tests allow the recognition of defective points.

The system comprises a reading device for reading an identifier adapted to identify the tyre, a transport system provided with a plurality of transport sections for transporting the tyres along a transport direction, at least one testing device and at least one control device adapted to control the reading device, the transport system and the testing device. The transport system is provided with a plurality of sensors which detect the presence of a tyre in the transport sections. The control device is configured for recording the position of the tyre in the transport sections and for tracking the movement of the tyre. In an embodiment of this document, two testing devices arranged sequentially and designed to test the tyres by different measurement methods are shown.

Document WO2014/145258 illustrates a machine for testing tyres comprising a lower mandrel provided with a lower half-portion of a rim, an upper mandrel provided with an upper half-portion of a rim and an actuator configured for varying the distance between the lower mandrel and the upper mandrel along a vertical axis, for engaging the tyre beads. The tyre is then inflated and rotated while an outer peripheral portion thereof is pressed against an element which simulates the road surface.

Document US20160225128 illustrates a tyre inspection line comprising a macroscopic inspection station and a microscopic inspection station.

The macroscopic inspection station is configured for acquiring at least one macroscopic image of the tyre, comparing it with a reference image and detecting possible deviations from the standard tyre. The microscopic inspection station is configured for acquiring at least one microscopic image of the inner or outer pattern of the tyre to compare it with a representative image of a tyre reference surface or to analyse said microscopic image acquired with processing algorithms. Each of the stations includes a motor for rotating the tyre and image acquisition devices. The microscopic inspection station comprises a first station and a second station and a tyre overturning device located between the first station and the second station for acquiring images of a first semi-half and a second semi-half of the tyre.

SUMMARY

In the field of automated apparatus for checking tyres coming from a production line, the Applicant has felt the need to reduce the space and time required for carrying out the checks.

The Applicant has in fact observed that the apparatuses for checking tyres of the type described above, extend along very long paths and carry out a plurality of checks by means of separate devices arranged in a sequence along the aforementioned paths.

The Applicant has also observed that the same apparatuses for checking tyres adopt dedicated devices for checking the tyres and devices which are distinct and located in different positions for managing/moving/orienting the tyres according to the checks to be performed.

The Applicant then observed that the same apparatuses for checking tyres occupy large spaces and that such spaces are often not available in the structures and plants used for the placement of the tyre production lines. The Applicant therefore perceived the need to perform such automated checks in contained spaces, so as to be able to easily place the apparatuses dedicated to such checks at the tyre production sites.

The Applicant has observed that this problem appears even more relevant considering that the checks on the tyres produced must suitably provide for low definition and high definition checks to prevent damage to the check devices themselves. In fact, it is advisable to perform a complete low-definition preliminary check of the whole tyre, so as to know the size and shape thereof with certainty and prepare it for the high-definition check or checks carried out subsequently or discard it if it does not meet certain requirements, thus preventing possible damage to devices responsible for high-definition checks.

The Applicant has also perceived the need to perform these checks in a short time and generally compatible with the cycle time of an upstream production line.

Finally, the Applicant has found that the use of a single checking station in which a first half of the tyre is subjected to the aforesaid checks, before overturning it and performing the same checks on a second half of the same tyre, allows performing a complete analysis at least in low definition in a contained space, solving the above problems.

According to a first aspect thereof, the present invention relates to a station for checking tyres.

Preferably, a support structure is provided, delimiting an operating space configured for receiving a tyre.

Preferably, an overturning device is provided, having grip elements configured for engaging a radially outer portion of the tyre.

Preferably, the overturning device is operative within said operating space and is configured for overturning the tyre around an overturning axis perpendicular to a rotation axis of the tyre while the tyre is situated in said operating space.

Preferably, a checking device is provided, comprising a mechanical arm and at least one sensor associated with said mechanical arm, wherein said mechanical arm is operatively active within the operating space.

Preferably, said mechanical arm is configured for carrying said at least one sensor at least partially within the tyre for executing checks on an inner surface of the tyre housed in the operating space.

According to a second aspect thereof, the present invention relates to a method for checking tyres.

Preferably, it is provided to arrange a tyre in a station for checking tyres.

Preferably, it is provided to carry at least one sensor within the tyre.

Preferably, it is provided to execute first checks on an inner surface of the tyre by means of said at least one sensor.

Preferably, it is provided to engage a radially outer portion of the tyre with grip elements of an overturning device.

Preferably, it is provided to extract at least one sensor from the tyre and space said at least one sensor from the tyre.

Preferably, it is provided to overturn the tyre by 180° by means of a rotation of the grip elements around an overturning axis perpendicular to a rotation axis of the tyre.

Preferably, it is provided to carry said least one sensor again within the tyre.

Preferably, it is provided to execute second checks on the inner surface of the tyre by means of said at least one sensor.

Preferably, it is provided to extract at least one sensor from the tyre and space said at least one sensor from the tyre.

Preferably, it is provided to carry the tyre outside the station for checking tyres.

The Applicant believes that the station according to the present invention has a compact structure and such as to allow easy installation thereof also within existing structures and plants used for the production of tyres.

The Applicant further believes that the station according to the present invention allows carrying out a plurality of checks in a contained space and in short times, generally compatible with the cycle time of an upstream production line.

According to a further aspect thereof, the present invention relates to an apparatus for checking tyres.

Preferably, a first check unit is provided, having an inlet for the tyres and comprising a first plurality of checking tools.

Preferably, a second check unit is provided, having an outlet for the tyres and comprising a second plurality of checking tools.

Preferably, an overturning and transport device is provided, operatively interposed between the first check unit and the second check unit.

Preferably, the first check unit, the second check unit and the overturning and transport device define a check path configured so as to be traversed by pitches by each tyre.

Preferably, the first check unit and the second check unit are configured for executing high-definition checks on at least respective halves of the tyres.

Preferably, the apparatus for checking tyres comprises a station for checking tyres according to the first aspect of the present invention.

Preferably, said station is placed immediately upstream of the first check unit and is configured for executing a low-definition checking of the tyres before the entrance into the first check unit.

According to another aspect thereof, the present invention relates to a process for checking tyres.

Preferably, it is provided to simultaneously advance, by pitches, tyres along a check path and check, during time intervals situated between subsequent pitches, said tyres.

Preferably, for each of the tyres, it is provided to check at least one first half of the tyre by executing a plurality of high-definition checks along a first part of the check path.

Preferably, for each of the tyres, it is provided to overturn said tyre around an overturning axis after the exit from said first part of the check path.

Preferably, for each of the tyres, it is provided to conduct said tyre to the inlet of a second part of the check path.

Preferably, for each of the tyres, it is provided to check at least one second half of said tyre by executing the same plurality of high-definition checks along said second part of the check path.

Preferably, prior to the entrance into the first part of the check path, it is provided to execute the method for checking tyres according to the second aspect of the invention for executing a preliminary low-definition check of the tyres prior to said high-definition checks.

The Applicant believes that the present invention allows executing a complete preliminary low-definition check of the whole tyre, so as to know the size and shape thereof with certainty and arrange it for high-definition check or checks carried out in units placed downstream of the station according to the invention or discard it if it does not meet predetermined requirements.

In particular, according to the Applicant, the station and the method of the invention allow identifying tyres with macro-defects (such as bubbles and/ or internal and/or external detachments generated during vulcanisation) and preventing them from being subjected to the subsequent high definition checks.

The Applicant further believes that the station according to the present invention allows carrying out a plurality of checks in a contained space and in short times, generally compatible with the cycle time of a high-definition checking apparatus possibly placed downstream.

Finally, the Applicant believes that the station according to the present invention may also be configured as a stand-alone and independent unit, both for a low-definition check and for a high-definition check of the tyres.

The present invention, in at least one of the above aspects thereof, can exhibit one or more of the following preferred features.

Preferably, the overturning device is a gripper comprising a first arm and a second arm movable in mutual approaching or moving apart.

Preferably, the grip elements comprising a first grip element situated on a respective end of the first arm and a second grip element situated on a respective end of the second arm.

The Applicant has verified that the gripper allows gripping and moving the tyre without hindering the passage of the sensor, the positioning thereof within the tyre and the operation thereof.

The Applicant has verified that the gripper allows gripping and handling tyres of different sizes and shapes.

Preferably, the grip elements are rotatable with respect to said first arm and second arm around the overturning axis.

This structure allows limiting the dimensions and thus the overall footprint of the station and the inertia involved in the overturning, since such an overturning is executed by rotating only the grip elements and not the whole gripper.

Preferably, the gripper is movable along a direction parallel to the rotation axis of the tyre.

Such a degree of freedom allows the tyre to be moved along such a direction and facilitate the overturning movement. This solution also allows reducing the size of the operating space and the station as a whole.

Preferably, the first grip element is motorised to rotate around the overturning axis and the second grip element is free to rotate on the second arm.

Only one of the two grip elements is moved by a dedicated actuator while the other is dragged by the tyre.

Preferably, the gripper comprises a rotation detector operatively connected to the second grip element to detect the rotation thereof.

The detector allows understanding whether the overturning occurs correctly or the tyre twists and/or is not correctly retained by the gripper.

Preferably, each of said first grip element and second grip element comprises a pair of reciprocally spaced cylinders configured for abutting against the radially outer portion of the tyre with its own axes parallel to the rotation axis of the tyre.

This structure of the grip elements allows handling tyres of very different dimensions and shapes, obtaining the correct grip by the gripper.

Preferably, a grip member configured for engaging at least one tyre bead is provided.

Preferably, the grip member is operative within the operating space.

Preferably, the grip member is configured for supporting the tyre in abutment against a sidewall while situated in said operating space.

The grip member is capable of supporting the tyre in place of the gripper.

Preferably, the grip member comprises at least three projections, preferably four, parallel to a central axis thereof and movable between a contracted position, in which they lie close together and close to said central axis, and a grip position, in which they lie spaced from each other and equidistant from the central axis, in order to engage the bead of the tyre.

Preferably, the grip member is movable along its central axis.

Such a degree of freedom allows the tyre to be moved along such a direction and facilitate the insertion and extraction of the sensor.

Preferably, the grip member comprises at least three support arms, preferably four, each carrying a respective projection.

Preferably, the projections are movable along the arms between the contracted position and the grip position.

Preferably, said at least three support arms are angularly equidistant.

The arms act as a support and guide for the projections protruding from said arms.

Preferably, a rotary device carrying the grip member is provided.

Preferably, the rotary device is configured for rotating the grip member around the central axis, preferably while the grip member is situated in said operating space.

The rotation of the grip member allows keeping said at least one sensor fixed and rotate the tyre to execute the checks.

Preferably, an abutment plane for the tyre is provided.

Preferably, said abutment plane is perpendicular to the rotation axis of the tyre.

Preferably, said abutment plane faces the operating space.

The abutment surface allows the tyre to rest in the station before it is taken by the grip member or by the gripper.

Preferably, the abutment plane is defined by a motorised roller conveyor. Preferably, the motorised roller conveyor comprises a plurality of driven rollers preferably mounted on the support structure.

Preferably, the abutment plane is defined by one or more conveyor belts.

Preferably, the abutment plane is movable along an advancement direction perpendicular to the rotation axis of the tyre and perpendicular to the overturning axis.

The motorised roller conveyor or conveyor belt allow the tyre to be moved along the advancement direction to be loaded into the station or unloaded from the station.

Preferably, the abutment plane has an opening configured for allowing the passage of the grip member.

Preferably, the grip member is movable between a rest position, in which it lies retracted into the opening, and an operating position, in which it projects from the opening to engage the tyre.

When not in use, the grip member is taken out of the operating space to allow the tyre to overturn without interference. This solution also allows reducing the size of the operating space and the station as a whole.

Preferably, the opening is counter-shaped to the grip member.

In this way, the abutment plane is sufficiently extended to provide a stable surface to the tyre.

Preferably, the mechanical arm of the checking device is movable along a direction parallel to the rotation axis of the tyre and along a direction perpendicular to the rotation axis of the tyre.

These degrees of freedom allow the sensor to be moved so that it does not hinder the overturning of the tyre and contain the dimensions, especially in height, of the support structure.

Preferably, the check device comprises at least one auxiliary sensor configured for executing checks on an outer surface of the tyre housed in the operating space.

Preferably, said at least one auxiliary sensor is mounted on the support structure.

Preferably, said at least one sensor and/or said at least one auxiliary sensor is an optical sensor, preferably an image detector.

Preferably, said at least one sensor and/or said at least one auxiliary sensor is a 3D scanner.

Preferably, said at least one sensor and/or said at least one auxiliary sensor comprises a camera and a laser emitter.

Preferably, said at least one sensor and/or said at least one auxiliary sensor has a definition ranging from about 0.05 mm to about 5 mm.

Such sensor(s) allow(s) the acquisition of low definition images for the purpose of carrying out a preliminary check of the tyre.

Preferably, said at least one sensor and/or said at least one auxiliary sensor has a definition ranging from about 0.01 mm to about 0.05 mm.

Such sensor(s) allow(s) the acquisition of high definition images for the purpose of carrying out a fine check of the tyre.

Preferably, the checking device comprises a code scanner, preferably bar code, configured for reading a code on the tyre.

Preferably, the code scanner is mounted on the support structure.

Preferably, the support structure has an inlet for the tyre.

Preferably, a measuring device is also provided, placed at the inlet and configured for detecting a diameter and an axial size of the tyre.

Preferably, the measuring device comprises an emitter and a receiver configured for generating an optical barrier through the inlet.

Preferably, the optical barrier develops in a plane perpendicular to the advancement direction and parallel to the rotation axis of the tyre.

While the tyre passes through the optical barrier, the measuring device detects the axial size of the tyre according to the percentage of the optical barrier that the tyre intercepts. Knowing the advancement speed of the tyre, that is, the speed of the support surface (of the rollers or of the conveyor belt), the measuring device detects the tyre diameter according to the time elapsing from when the tyre intercepts for the first time the optical barrier and to when it comes out thereof completely. Consequently, the position of the centre of the tyre becomes known and the time at which to stop the advancement thereof can be calculated, since the centre of the grip member is known. Since the rotation speed of the rollers is known, it is in fact possible to obtain the time needed to align the centre of the tyre with the centre of the grip member, making a preliminary centring in the direction of advancement of the tyre.

Preferably, the central axis of the grip member is vertical.

Preferably, the overturning device and the checking device are placed above the grip member.

Preferably, the rotary device is placed partly below the abutment plane and the overturning device and the checking device are placed above the abutment plane.

Preferably, the support structure comprises a frame having a lower portion configured for being rested on the ground and an upper portion, wherein the operating space is delimited between the abutment plane and the upper portion.

Preferably, the mechanical arm is constrained to the upper portion and protrudes towards the abutment plane.

Preferably, the overturning device is constrained to one side of the frame.

Preferably, the gripper extends cantilevering from said side of the frame.

Preferably, it is provided to engage a bead of the tyre with a grip member in order to lock the tyre on the grip member, after having arranged the tyre in the station for checking tyres and prior to carrying said at least one sensor within the tyre.

Preferably, it is provided to disengage the grip member from the tyre while the tyre is retained by the grip elements, after having engaged the radially outer portion of the tyre with the grip elements of the overturning device and prior to overturning the tyre by 180°.

Preferably, it is provided to engage an opposite bead of the tyre with said grip member, after having overturned the tyre by 180° and prior to once again carrying said at least one sensor within the tyre.

Preferably, it is provided to disengage the grip elements from the radially outer portion of the tyre.

In this way, the correct position of the tyre is obtained, because the tyre is not free to move in the station, but is retained by the grip member or by the grip elements.

Preferably, it is provided to rotate a rotary device carrying the grip member and the tyre around a rotation axis of the tyre while the first checks are executed on the inner surface of the tyre.

Preferably, it is provided to stop the rotation of the rotary device and of the tyre, after having executed the checks on the inner surface of the tyre and prior to engaging the radially outer portion of the tyre with the grip elements.

Preferably, it is provided to once again rotate the rotary device and the tyre around the rotation axis of the tyre while the second checks are executed on the inner surface of the tyre.

The rotation of the tyre around its rotation axis allows executing the checks while keeping the sensors fixed and keeping the space occupied by the tyre unchanged.

Preferably, after placing the tyre in the station for checking tyres and prior to carrying said at least one sensor within the tyre, a preliminary centring of the tyre along a transverse direction is provided.

Preferably, the preliminary centring is executed by symmetrically and simultaneously moving a first grip element and a second grip element of the overturning device until they are brought against diametrically opposed areas of the radially outer portion of the tyre while the tyre rests on an abutment plane and subsequently spacing the first grip element and the second grip element from the tyre.

In other words, the gripper is self-centring and the tyre is moved on the abutment plane by centring itself along the transverse direction. This solution allows executing the preliminary centring in the direction orthogonal to the advancement on tyres of different shapes and dimensions, the preliminary centring in the direction of advancement being carried out as illustrated above.

Preferably, engaging the bead or engaging the opposite bead of the tyre with the grip member includes: executing a fine centring of the tyre by making the rotation axis of the tyre coincide with a central axis of the grip member.

When the gripper engages the bead, it also executes the centring.

Preferably, engaging the bead or engaging the opposite bead of the tyre with the grip member comprises: simultaneously and symmetrically moving at least three projections of the grip member from a contracted position, in which they lie close to each other and close to the central axis of the grip member, into a grip position, in which said at least three projections lie spaced from each other and equidistant from the central axis of the grip member up to carrying said projections in contact with the bead so as to make the central axis coincide with the rotation axis of the tyre.

The three projections are self-centring and move symmetrically and simultaneously along preferably radial directions of the tyre so as to cause the centring thereof.

Preferably, after locking the tyre on the grip member and before carrying out the first checks on the inner surface of the tyre, it is provided to raise the tyre from the abutment plane.

Preferably, bringing said at least one sensor within the tyre comprises: lowering a mechanical arm, wherein said at least one sensor is placed at one end of the mechanical arm.

The lifting of the tyre allows limiting the stroke of the mechanical arm and the dimensions of the structure necessary to obtain it.

Preferably, executing the first and second checks on the inner surface of the tyre includes: executing optical scans of the inner surface of the tyre through said at least one sensor.

Preferably, the method comprises: executing first and second checks on an outer surface of the tyre by at least one auxiliary sensor mounted on the support structure.

Preferably, executing the first and second checks on the outer surface of the tyre includes: executing optical scans of the outer surface of the tyre through said at least one auxiliary sensor.

Preferably, the first checks on the inner surface and the first checks on the outer surface are carried out simultaneously.

Preferably, the second checks on the inner surface and the second checks on the outer surface are carried out simultaneously.

Preferably, it is provided to read an identification code of the tyre, preferably a bar code, by means of a scanner mounted on the support structure, preferably simultaneously with the first checks or simultaneously with the second checks.

Preferably, the first checks are executed on a first half of the tyre and the second checks are executed on a second half of the tyre.

Preferably, engaging the radially outer portion of the tyre with grip elements comprises: symmetrically and simultaneously closing a first arm carrying a first grip element and a second arm carrying a second grip element of the overturning device on the tyre.

Preferably, overturning the tyre by 180° comprises: causing the 180° rotation of the first grip element with respect to the first arm and/or causing the 180° rotation of the second grip element with respect to the second arm.

Preferably, before overturning the tyre by 180°, it is provided to further raise the tyre with respect to the abutment plane.

Preferably, before engaging the opposite heel of the tyre, it is provided to lower the tyre towards the abutment plane.

Preferably, arranging a tyre in the station for checking tyres comprises: inserting the tyre through an inlet of the station for checking tyres making it advance along an advancement direction and on an abutment plane of said station.

Preferably, during the insertion, the method comprises: detecting a diameter and an axial dimension of the tyre.

Preferably, detecting a diameter and an axial size of the tyre comprises: making the tyre transit through an optical barrier arranged through the inlet.

Preferably, arranging the tyre in the station for checking tyres comprises: performing a preliminary centring of the tyre along the advancement direction.

Preferably, executing the preliminary centring of the tyre along the advancement direction comprises: stopping the advancing of the tyre as a function of the detected diameter.

Preferably, the station for checking tyres according to the present invention is a stand-alone station.

Preferably, the station for checking tyres according to the present invention is configured for executing low-definition checks.

Preferably, the station for checking tyres according to the present invention is configured for executing high-definition checks.

Further features and advantages will appear more clearly from the detailed description of a preferred but non-exclusive embodiment of a station for checking tyres according to the present invention.

DESCRIPTION OF THE DRAWINGS

Such description is given hereinafter with reference to the accompanying drawings, provided only for illustrative and, therefore, non-limiting purposes, in which.

DETAILED DESCRIPTION

Figure 1:
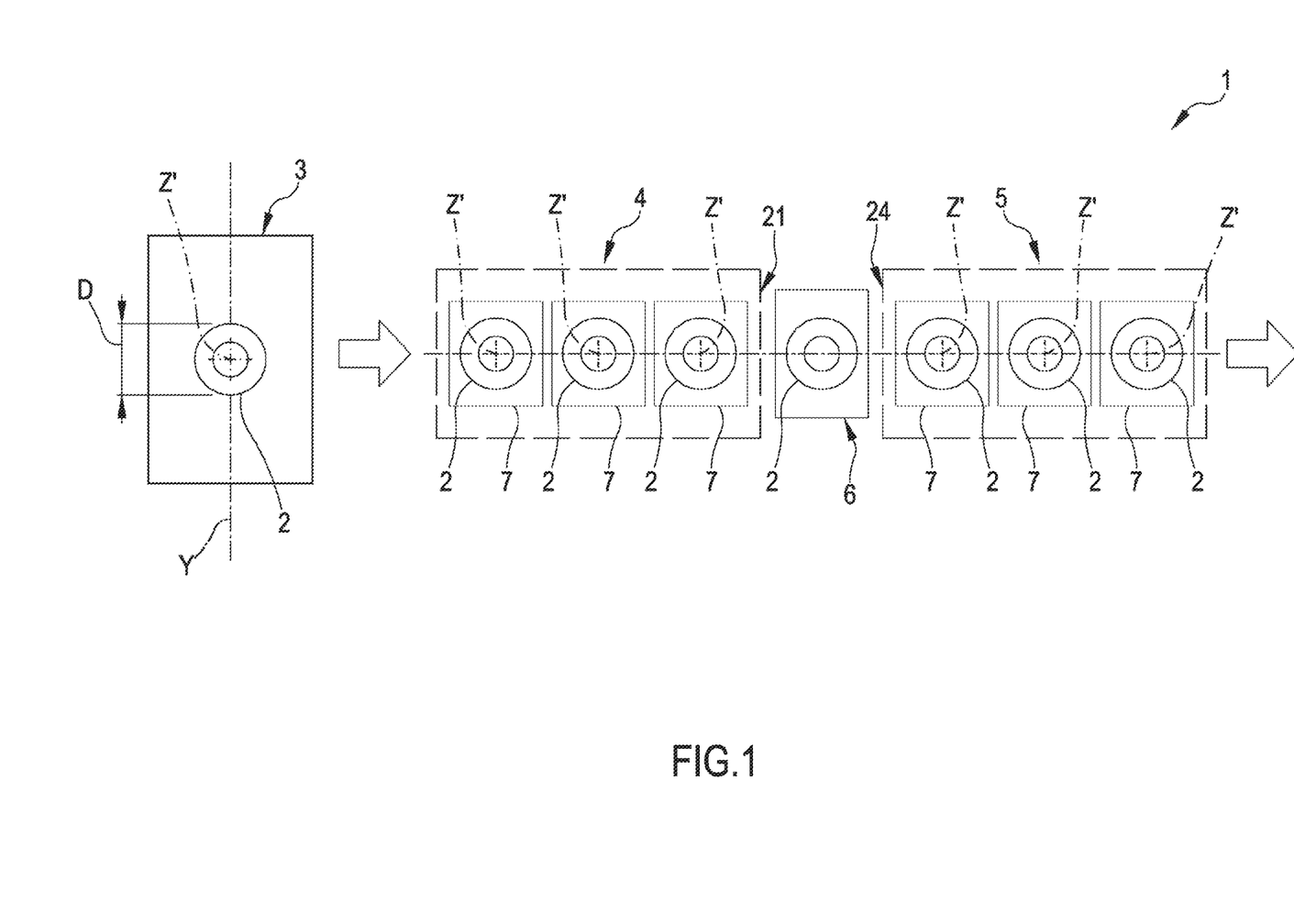
FIG. 1 schematically shows an apparatus for checking tyres comprising a station for checking tyres according to the present invention.

With reference to FIG. 1, reference numeral 1 globally indicates an apparatus for checking tyres. The apparatus 1 is configured for executing a plurality of non-destructive tests on the tyres 2 arriving from a production plant, not shown.

The production plant comprises a production line of tyres consisting of a building apparatus of green tyres and at least one moulding and vulcanisation unit operatively arranged downstream of the building apparatus.

In a non-limiting embodiment, the building apparatus comprises a carcass building line, at which forming drums are moved between different delivery stations of semi-finished products arranged to form a carcass sleeve on each forming drum. At the same time, in an outer sleeve building line, one or more auxiliary drums are sequentially moved between different stations arranged to form an outer sleeve on each auxiliary drum. The building apparatus further comprises an assembling station at which the outer sleeve is coupled to the carcass sleeve.

In other embodiments of the production plant, the building apparatus may be of different type, for example designed to form all of the above components on a single drum.

The built tyres 2 are finally transferred to the moulding and vulcanisation unit.

From the production line, in particular, from the moulding and vulcanisation unit, the finished tyres 2 exit sequentially one after the other with a predefined rate and a corresponding predefined production cycle time.

The apparatus 1 for checking the tyres 2 is located immediately downstream of the production line and is configured for executing the non-destructive tests after the moulding and vulcanisation of said tyres 2.

The apparatus 1 for checking the tyres 2 comprises a station 3 for checking tyres 2 configured for executing a preliminary and low-definition check of the tyres 2 themselves. The apparatus 1 for checking the tyres 2 further comprises a first check unit 4, a second check unit 5 and an overturning and transport device 6 operatively interposed between the first check unit 4 and the second check unit 5. The first check unit 4 and the second check unit 5 are configured for executing a plurality of high-definition checks on respective halves of the tyres 2. The first check unit 4, the second check unit 5 and the overturning and transport device 6 define a check path configured so as to be traversed by pitches by each tyre 2. According to the embodiment illustrated schematically in FIG. 1, the first check unit 4 and the second check unit 5 comprise a plurality of high-definition checking stations 7 (three stations for each unit in the illustrated example). In each of the high-definition checking stations 7 of the first check unit 4, a tyre 2 rests on a respective sidewall and a half thereof is subjected to high-definition checks, by means of a first plurality of checking tools, while the tyre 2 is rotated about its own rotation axis Z'. In each of the high-definition checking stations 7 of the second check unit 5, the tyre 2 rests on an opposite side and the other half of the tyre 2 is subjected to the high-definition checks, by means of a respective second plurality of checking tools, while the tyre 2 is rotated about its own rotation axis Z'.

The station 3 for checking tyres 2 is located upstream of the first check unit 4 and is adjacent to an inlet of the tyres 2 in said first check unit 4.

Figure 2:
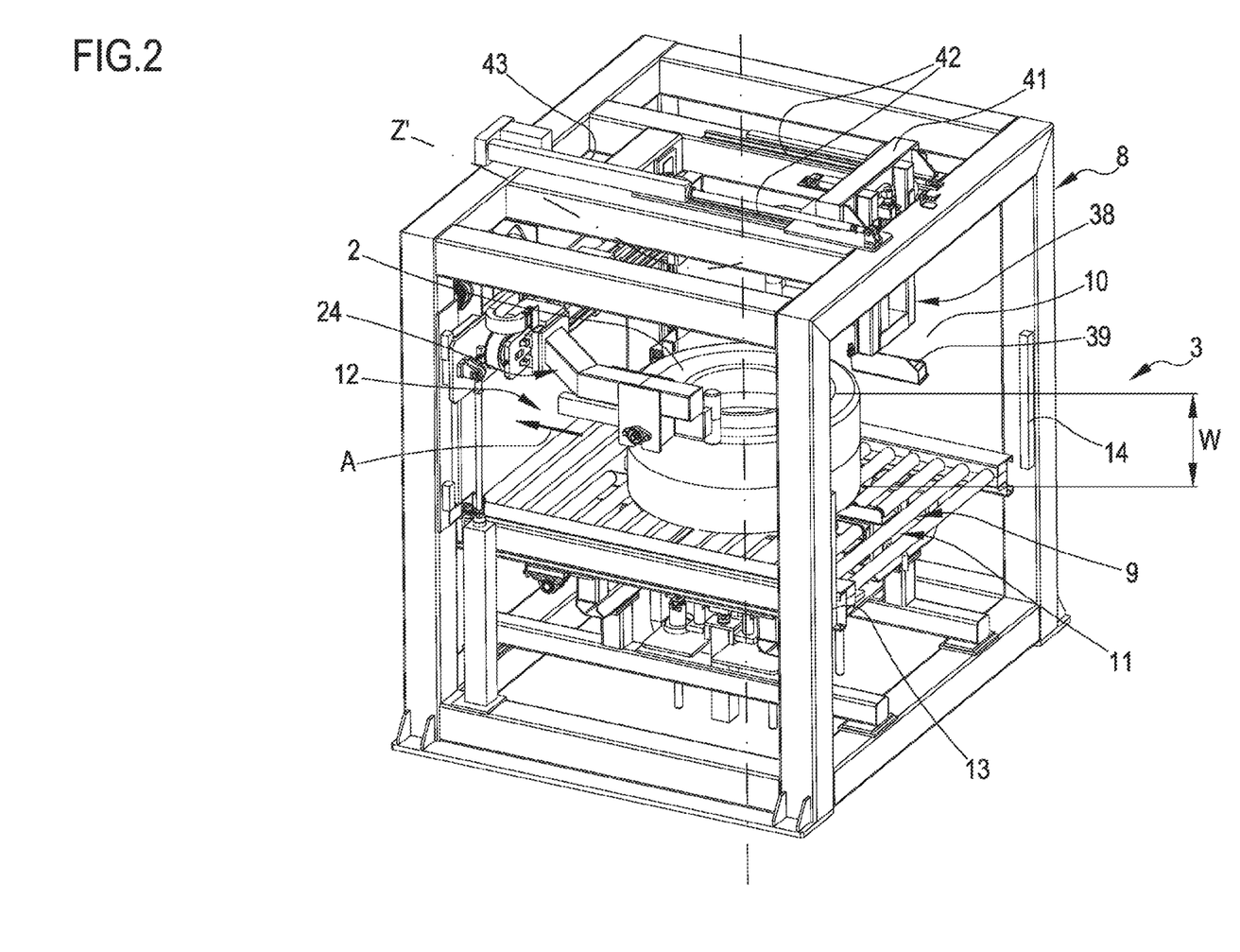
FIG. 2 shows an overall three-dimensional view of the station for checking tyres in FIG. 1.
Figure 3:
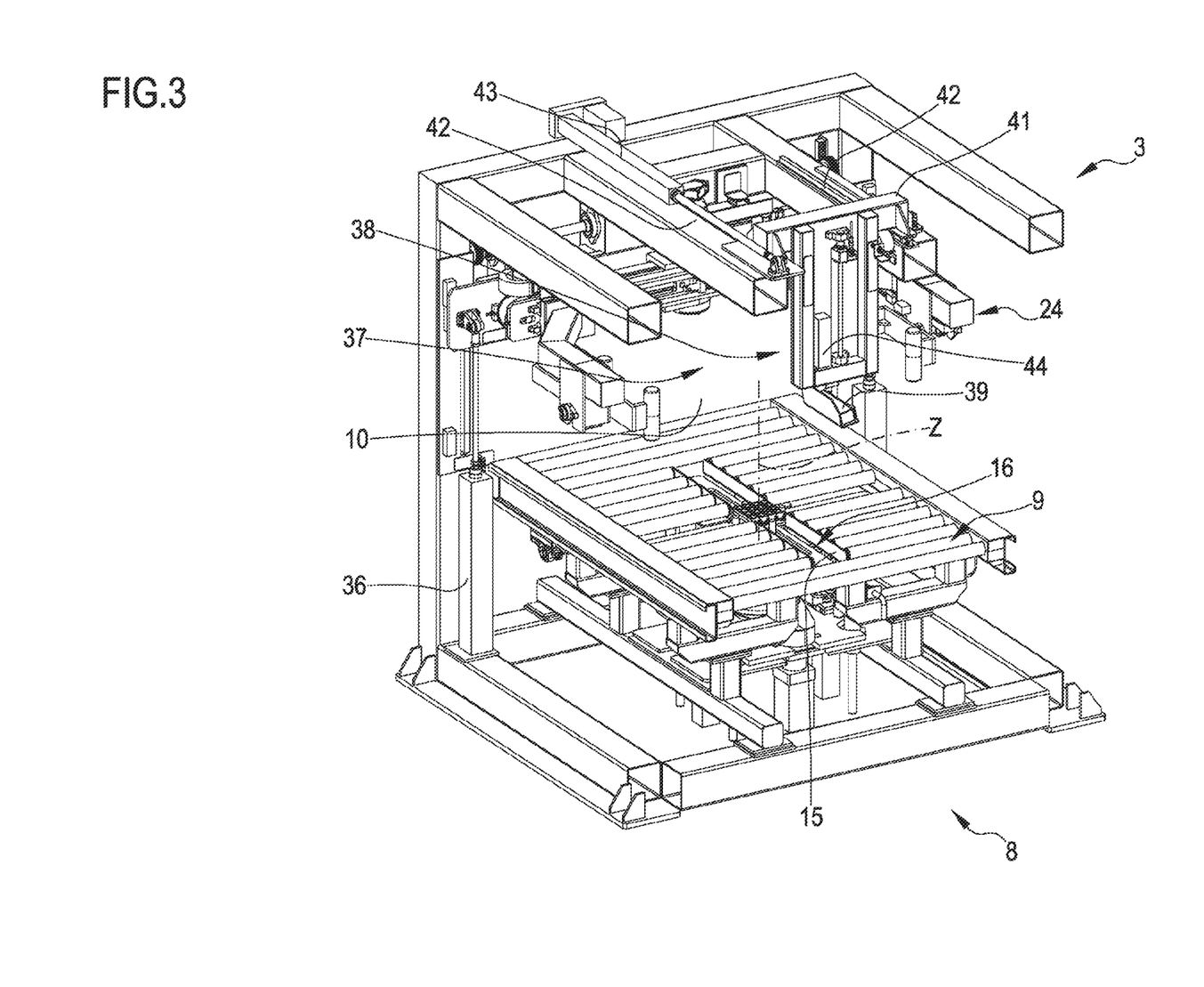
FIG. 3 shows the three-dimensional view of FIG. 2 with some parts removed to better highlight others.
Figures 4, 5, 5A:
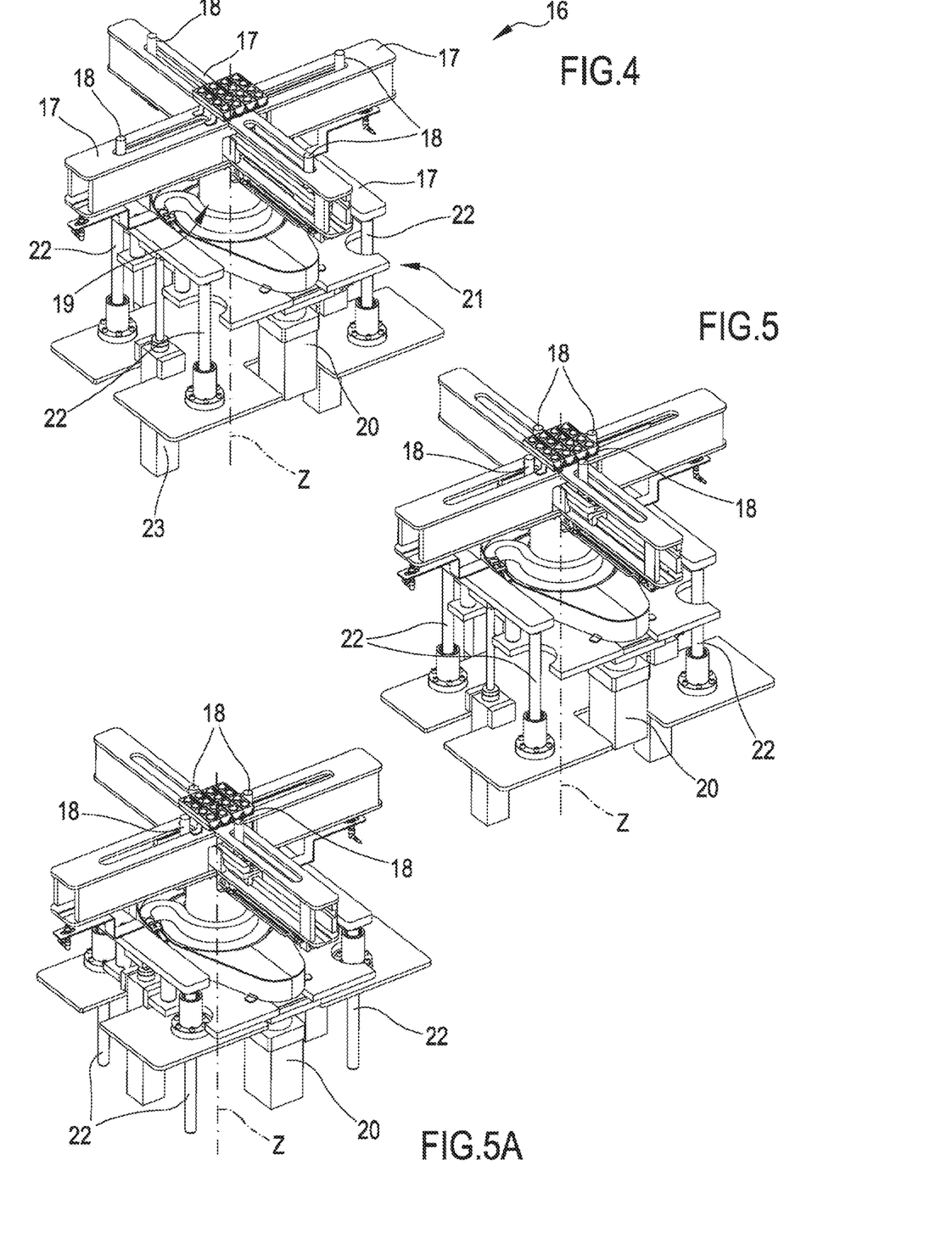
FIG. 4 shows an element of the station shown in FIGS. 2 and 3 in an operating configuration.
FIG. 5 shows the element in FIG. 4 in a different operating configuration.
FIG. 5A shows the element in FIG. 4 in a further different operating configuration.

The station 3 for checking tyres 2 is illustrated in greater detail in FIGS. 2 and 3. The station 3 for checking tyres 2 comprises a support structure 8 consisting of a frame comprising four uprights connected by upper and lower cross members. The support structure 8 has a lower portion configured for resting on the ground and an upper portion. Within the support structure 8, a motorised roller conveyor 9 is mounted which defines a horizontal abutment plane configured for supporting a tyre 2 resting on one of the sidewalls thereof. The abutment plane is therefore perpendicular to the rotation axis Z' of the tyre 2.

The motorised roller conveyor 9 comprises a plurality of driven rollers rotating about respective axes and defining an advancement direction A perpendicular to the rotation axis Z' of the tyre 2 when it is resting on the rollers. The motorised roller conveyor 9 allows the tyre 2 to be moved along the advancement direction A to be loaded into the station 3 or unloaded from the station 3. In an alternative embodiment not illustrated, the movable abutment plane is defined by one or more conveyor belts.

Between the upper portion of the support structure 8 and the motorised roller conveyor 9, an operating space 10 is defined that is configured for receiving, moving and checking one tyre 2 at a time. The operating space 10 is therefore delimited between the abutment plane and the upper portion. Finally, the abutment plane faces the operating space 10.

First two uprights of the four uprights of the support structure 8 delimit an inlet 11 for the tyre 2 and the remaining two uprights define an outlet 12 for the tyre 2.

A measuring device is configured for measuring a diameter D and an axial dimension W of the tyre 2. The measuring device comprises an emitter 13 of electromagnetic waves, preferably falling in a band comprising the infrared, the visible light and the ultraviolet, even more preferably of the laser type, and a receiver 14 configured for generating an optical barrier through the inlet 11. The emitter 13 and the receiver 14 are mounted on the first two uprights and are facing each other. The emitter 13 and the receiver 14 have a vertical extension such as generate a laser beam lying in a vertical plane and extending between said two first uprights. The laser beam constitutes the optical barrier, extending vertically in height starting substantially from the abutment plane and having a height greater than or equal to the maximum axial dimension W of the tyre 2 to be checked. The vertical plane in which the laser beam lies, that is, the optical barrier, is therefore perpendicular to the advancement direction A and parallel to the rotation axis Z' of the tyre 2.

The measuring device comprises an electronic management system connected to the emitter 13 and to the receiver 14 and connected to a motor, not shown, which determines the rotation of the driven rollers of the motorised roller conveyor 9. Knowing the advancement speed of the tyre 2, i.e. the rotation speed of the rollers, the measuring device detects the diameter D of the tyre 2 as a function of the time elapsing between when the tyre 2, which enters through the inlet 11, intercepts for the first time the optical barrier and when it comes out completely from the optical barrier, i.e. when the tyre 2 has completed its entrance into the station 3, is housed in the operating space 10 and firmly supported on the abutment plane.

The electronic management system also allows detecting the maximum percentage of the optical barrier which intercepts the tyre 2 while the tyre 2 passes therethrough and calculates the axial dimension W of the tyre 2 itself.

According to a method for checking tyres according to the invention, the electronic management system, which is preferably the management system of the whole station 3, controls the motorised roller conveyor 9 in such a way as to stop the driven rollers when the rotation axis Z' of the tyre 2 reaches a central axis Z of the station 3 (FIGS. 3, 4, 5 and 5A), or so as to execute a preliminary centring of the tyre 2 along the advancement direction A.

As can be seen in FIG. 3, the abutment plane has an opening 15 configured for allowing the passage of a grip member 16. Some of the driven rollers are missing and others are divided into two halves so as to give the opening 15 a cross shape.

The grip member 16 comprises (FIGS. 4, 5, 5A) four support arms 17.

The support arms 17 are horizontal and angularly equidistant, that is to say, arranged in a cross pattern. The opening 15 is therefore counter-shaped to the grip member 16.

Each of the support arms 17 carries a respective projection 18 which extends vertically and is movable and guided along the respective arm 17 by means of a respective actuator, not shown. The grip member 16 is mounted on a rotating device 19 around the central vertical axis Z and coinciding with a centre of the cross. The rotary device 19 is rotated by a motor 20 and is configured for rotating the grip member 16 around the central axis Z.

The four projections 18 are parallel to the central axis Z and are movable along the arms 17 between a contracted position (FIG. 5), in which they lie close to each other and close to said central axis Z, and a gripping position (FIG. 4), in which they lie spaced apart at the ends of the arms 17, and equally spaced from the central axis Z.

The grip member 16 is also movable in vertical translation, i.e. along its own central axis Z. In particular, the rotary device 19 is installed on a support element 21 movable along vertical guides 22 and moved by a respective first actuator 23.

The aforementioned vertical translation allows moving the grip member 16 between a lowered rest position (FIG. 5A), in which it lies retracted into the opening 15 and below the abutment plane, and at least one raised operating position (FIGS. 4 and 5), in which it protrudes from the opening 15.

The grip member 16 is therefore operative within the operating space 10 and is configured for supporting the tyre 2 while said grip member 16 is in said operating space 10. In particular, the grip member 16 is configured for engaging a bead of the tyre 2 and in this way lock the tyre 2. In particular, when the four projections 18 are in the gripping position, in which they lie spaced apart at the ends of the arms 17, they are able to engage a radially inner edge of one of the beads of the tyre 2 so as to retain said tyre 2. The grip member 16 is also capable of supporting the tyre 2 resting on the arms 17.

Figure 11:
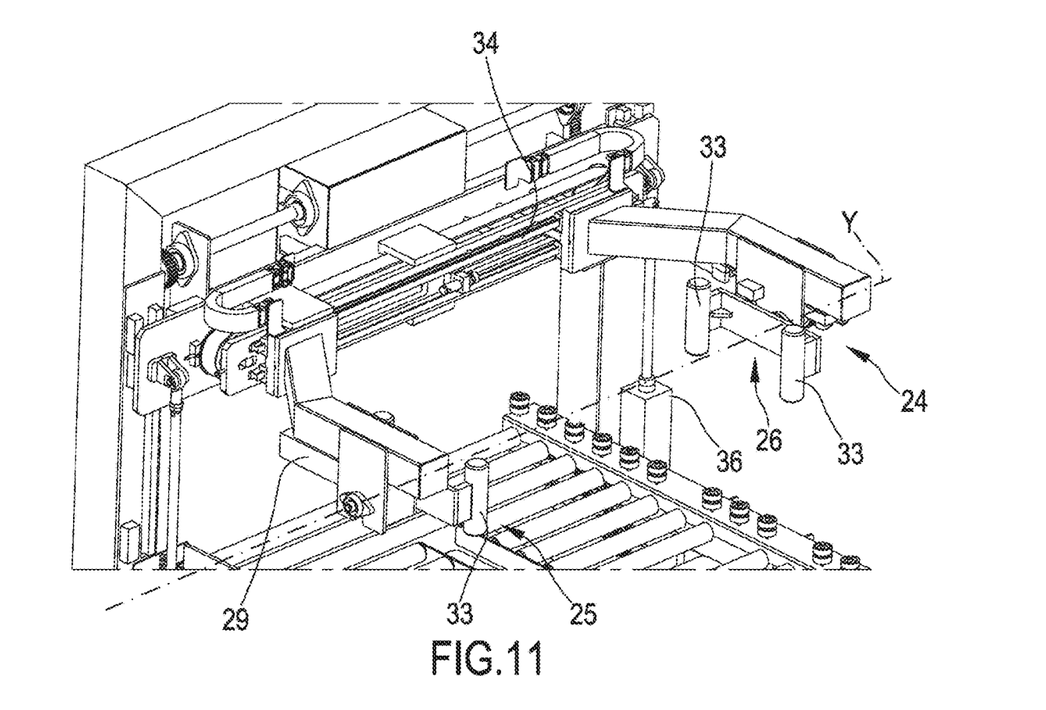
FIG. 11 shows an enlarged part of the element in FIGS. 9 and 10.
Figure 12:
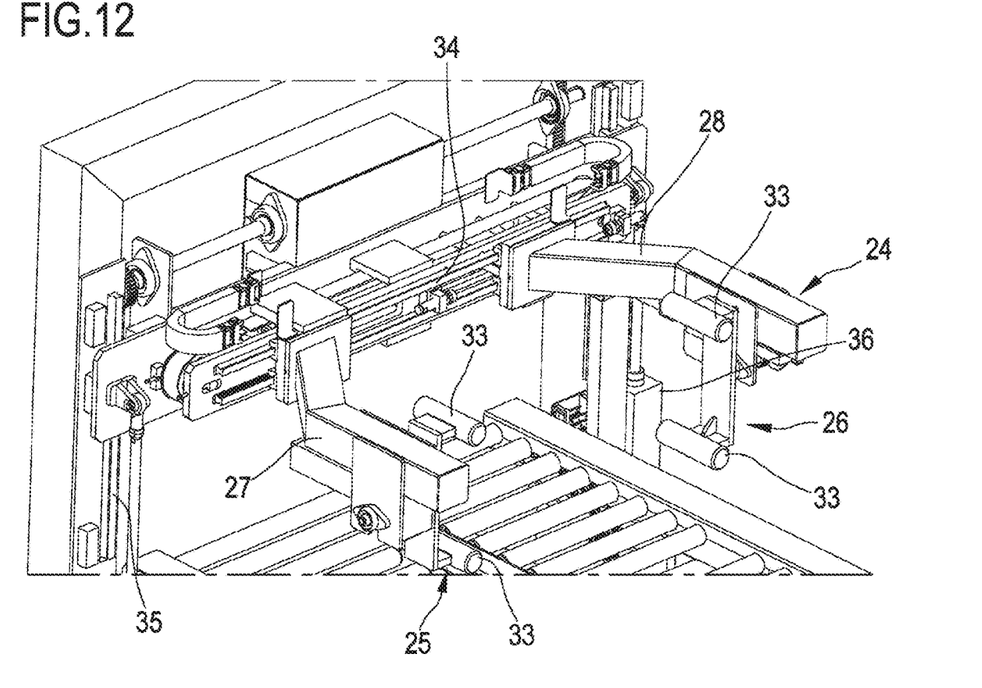
FIG. 12 shows a further enlargement of the element in FIGS. 9 and 10.
Figure 13:
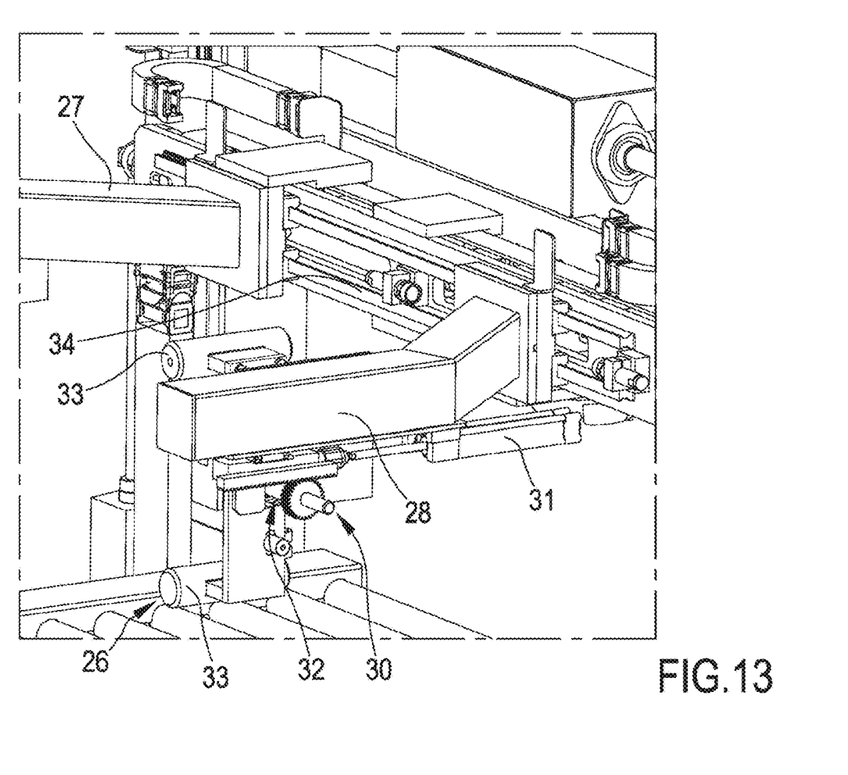
FIG. 13 shows a different enlarged part of the element in FIGS. 9 and 10.

The station 3 for checking tyres 2 comprises an overturning device 24 (FIGS. 9-13) having a first grip element 25 and a second grip element 26, configured for engaging a radially outer portion of the tyre 2. The overturning device 24 is a gripper comprising a first arm 27 and a second arm 28 movable in mutual approaching or moving apart. The first grip element 25 is mounted so as to be capable of rotating by 180° on a respective end of the first arm 27 and the second grip element 26 is mounted so as to be capable of rotating by 180° on a respective end of the second arm 28. The first grip member 25 and the second grip member 26 rotate about a common overturning axis Y (FIG. 11). The overturning axis Y is perpendicular to the advancement direction A and to the central axis Z. In the illustrated embodiment, the first grip element 25 is moved around the overturning axis Y by a second actuator 29. The second grip element 26 is free to rotate on the second arm 28 and is driven in rotation by the tyre 2 held between the first grip element 25 and the second grip element 26. The second grip element 26 is connected to a rotation detector 30 mounted on the second arm 28. In the illustrated embodiment (FIG. 13), the rotation detector 30 comprises a pneumatic actuator 31 mounted on the second arm 28 and connected to the second grip element 25 by means of a gear-rack pair 32. The gear is coaxial to the overturning axis Y and rotates with the first grip element 25. The rack is mounted on one end of a rod of the pneumatic actuator 31 and is engaged with the gear.

Each of said first grip element 25 and second grip element 26 comprises a pair of reciprocally spaced cylinders 33 configured for abutting against the radially outer portion of the tyre 2 with its own axes parallel to the rotation axis Z' of the tyre 2 itself. The two cylinders 33 are mounted on a plate hinged to the respective first arm 27 or second arm 28 about the overturning axis Y.

The first arm 27 and the second arm 28 are movable towards or away from one another by means of their translation on a horizontal guide 34 and by means of a dedicated actuator, not shown. The overturning device is therefore constrained to one side of the frame and the gripper extends cantilever from said side of the frame. The horizontal guide 34 is mounted on vertical guides 35 placed on two of the vertical uprights. A third actuator 36 allows the gripper to be moved on the vertical guides 35 and along a direction parallel to the rotation axis Z' of the tyre 2.

The overturning device is operative within the operating space 10, above the abutment plane, and is configured for overturning the tyre 2 around the overturning axis Y while the tyre is in said operating space 10.

The station 3 for checking tyres 2 comprises a checking device 37 configured for performing checks on an inner and outer surface of the tyre 2 housed in the operating space 10.

The checking device 37 comprises a mechanical arm 38 connected to the upper portion of the support structure 8. The mechanical arm 38 is operatively active within the operating space 10 and protrudes towards the abutment plane. The mechanical arm 38 has a lower end which carries a sensor 39 comprising a camera and an emitter of electromagnetic waves, preferably falling in a band comprising the infrared, the visible light and the ultraviolet, even more preferably of the laser type, configured for detecting low-definition 3D images (for example between about 0.3 mm and about 5 mm) which have the purpose of carrying out a preliminary check of the inner surface of the tyre 2. For example, this sensor 39 is a Gocator™ of LMI Technologies™. The mechanical arm 38 is mounted on a respective vertical guide 40 which in turn is carried by a carriage 41 movable on respective horizontal guides 42. A fourth actuator 43 allows moving the arm 38 and the sensor 39 along a horizontal direction perpendicular to the rotation axis Z' of the tyre 2. A fifth actuator 44 allows moving the arm 38 and the sensor 39 along a vertical direction parallel to the rotation axis Z' of the tyre 2.

Figure 6:
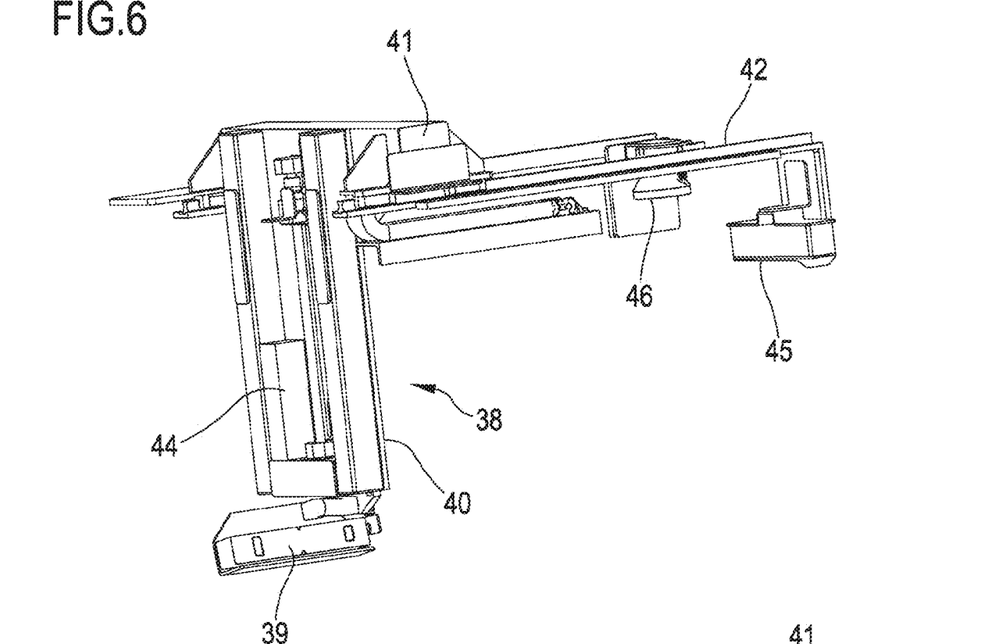
FIG. 6 shows a further element of the station shown in FIGS. 2 and 3 in an operating configuration.
Figure 7:
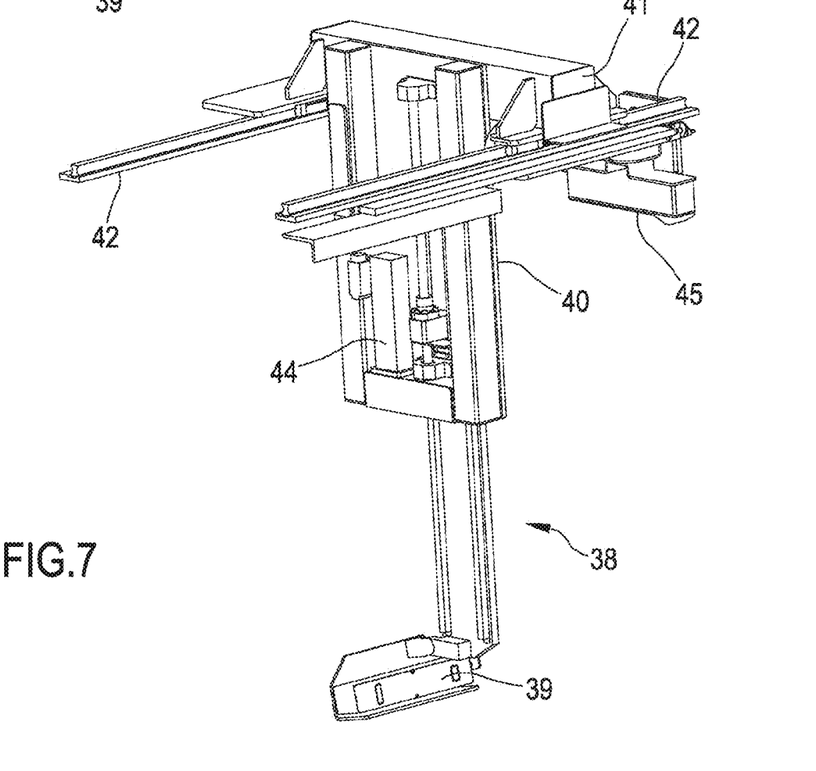
FIG. 7 shows the element in FIG. 6 in a different operating configuration.
Figure 8:
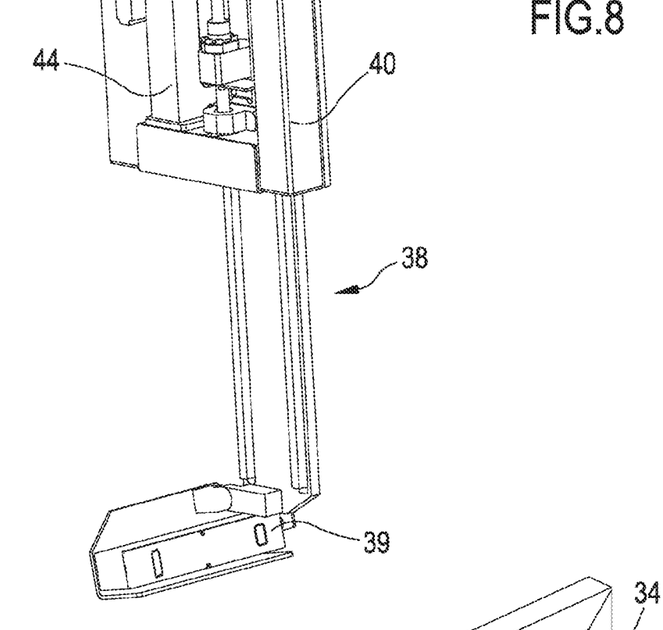
FIG. 8 shows an enlarged part of the element in FIGS. 6 and 7.
Figure 9:
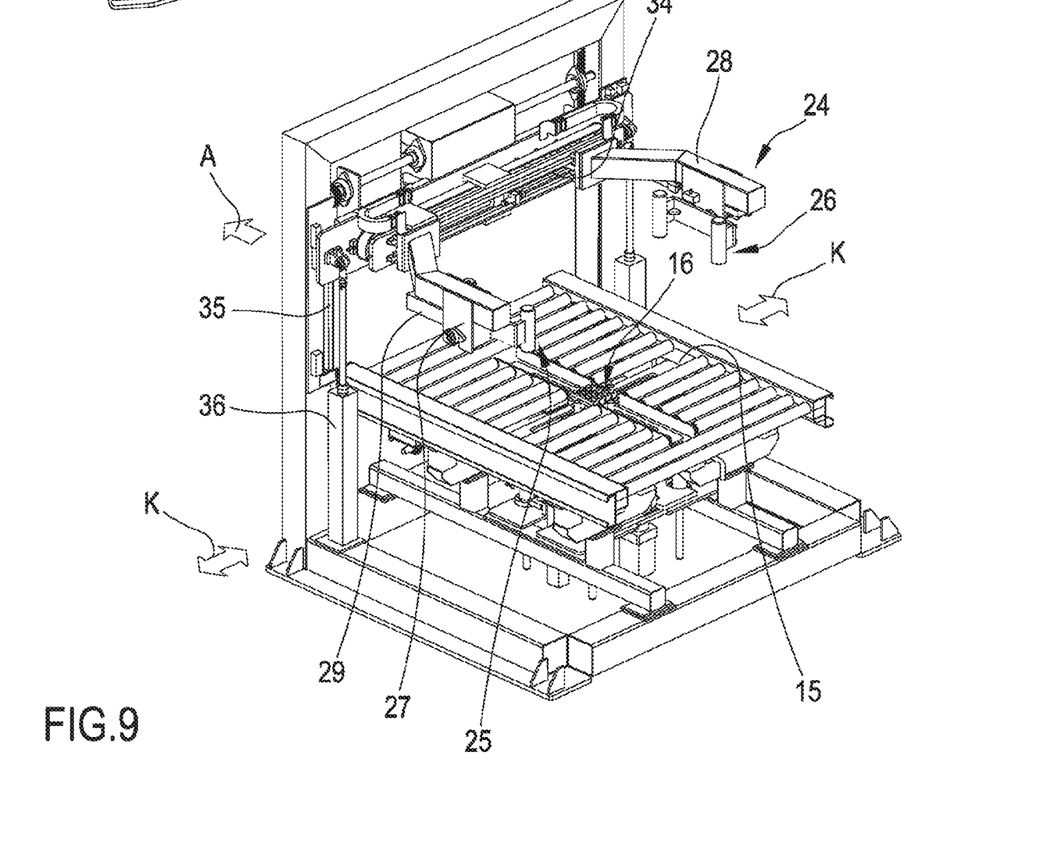
FIG. 9 shows the view in FIG. 2 with further parts removed to highlight a further element in an operating configuration.
Figure 10:
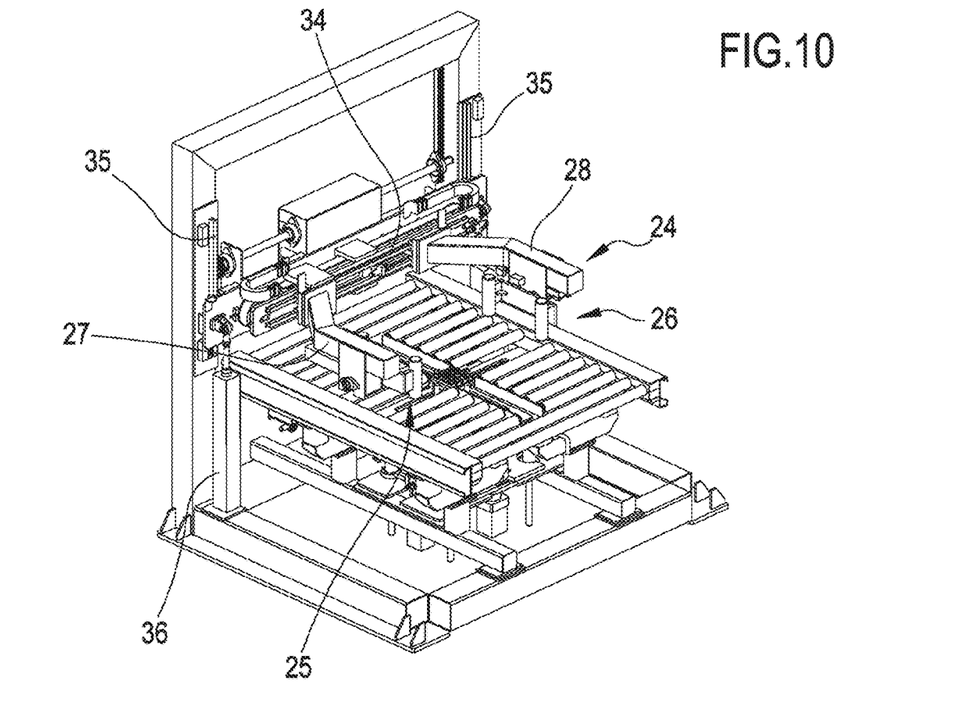
FIG. 10 shows the element in FIG. 9 in a different operating configuration.

The checking device 37 comprises one auxiliary sensor 45 (FIGS. 6 and 7) configured for executing checks on the outer surface of the tyre 2 housed in the operating space 10. The auxiliary sensor 45 is mounted fixedly on the upper portion of the support structure 8 and faces the abutment plane. The auxiliary sensor 45 comprises a camera and an emitter of electromagnetic waves, preferably falling in a band comprising the infrared, the visible light and the ultraviolet, even more preferably of the laser type, configured for detecting low-definition 3D images (for example between about 0.3 mm and about 5 mm) which have the purpose of carrying out a preliminary check of the outer surface of the tyre 2. For example, this sensor is also a Gocator™ from LMI Technologies™.

The checking device 37 comprises a bar code scanner 46, configured for reading a code on the tyre 2. The bar code scanner 46 is also fixedly mounted on the upper portion of the support structure 8 and faces the abutment plane.

The checking device 37, as well as the overturning device 24, is located above the gripping member 16 and above the motorised roller conveyor 9, i.e. the abutment plane.

According to the method for checking tyres according to the present invention, a tyre 2, coming for example from the moulding and vulcanisation unit of the tyre production line, is arranged in the station 3 for checking tyres making it transit through the inlet 11 along the advancement direction A (with a sidewall thereof resting on the abutment plane defined by the roller conveyor 9) through the motorised movement of the rollers of said roller conveyor 9.

During the insertion in the station 3, it is provided to detect the diameter D and the axial dimension W of the tyre 2 by means of the previously described measuring device. Furthermore, the preliminary centring of the tyre 2 along the advancement direction A is carried out.

Once the tyre 2 is stationary on the roller conveyor 9 with its own rotation axis Z' placed in the proximity of the central axis Z of the station 3, the gripper is lowered and the first arm 27 and the second arm 28 are closed symmetrically and simultaneously on the tyre 2, until the first grip element 25 and the second grip element 26 are brought against diametrically opposed areas of the radially outer portion of the tyre 2 while the tyre 2 rests on the abutment plane. Subsequently, the first grip member 25 and the second grip member 26 are removed from the tyre 2. In this way, the tyre 2 is centred along a transverse direction K horizontal and perpendicular to the advancement direction A. The gripper is therefore self-centring and the tyre 2 is displaced by sliding it onto the abutment plane.

In this step, the tyre 2 rests on the roller conveyor 9 and is located above the opening 15 of the roller conveyor 9 and above the grip member 16 while the grip member 16 is retracted in said opening 15.

The grip member 16 is partially lifted up to bring its four projections 18 to protrude beyond the abutment plane and place them in a radially inner position with respect to the bead of the tyre 2 placed near the roller conveyor 9. The four projections 18 are raised while in their contracted position. Subsequently, the four projections 18 of the grip member 16 are displaced simultaneously and symmetrically from the contracted position to the gripping position, until they are in contact with the bead. The four projections 18 exert a radial thrust on the bead towards the outside of the tyre 2, locking the tyre 2 on the grip member 16 and executing a fine centring, so as to make the central axis Z of the grip member 16 coincide with the rotation axis Z' of the tyre 2. Then, when the grip member 16 engages the bead, it also executes the fine centring of the tyre 2.

The grip member 16 is raised further so as to raise the tyre 2 from the abutment plane. The mechanical arm 38 brings the sensor 39 within the tyre 2 while the tyre 2 is in the raised position. In particular, the sensor 39, which was located at the upper portion of the support structure 8, is moved along a direction parallel to the advancement direction A and downwards until it enters within the tyre 2.

Once the sensor 39 has been positioned and the mechanical arm 38 is stopped, the rotary device 19 is rotated by rotating the tyre 2 by about 370° while the sensor 39 executes first checks, in particular by means of a 3D optical scan, of a first half of the inner surface of the tyre 2, the auxiliary sensor 45 executes first checks, in particular by means of a 3D optical scan, of a first half of the outer surface of the tyre 2. The bar code scanner 46 reads, if present, a bar code carried by the sidewall of the tyre 2 facing upwards. The bar code contains, for example, identification data of the tyre 2.

Once the first checks of a first half of the tyre 2 have been completed, the mechanical arm 38 provides to extract the sensor 39 from the tyre 2 and to move it away from the tyre 2 itself. At the same time, just before or shortly thereafter, the gripper is again moved by lowering it and closing the first arm 27 and the second arm 28 until the radially outer portion of the tyre 2 is engaged with the first grip element 25 and the second grip element 26. At this point, while the tyre 2 is supported by the gripper, the grip member 16 is disengaged from the bead of the tyre 2 causing the projections 18 to contract and lowering the grip member 16 until it is retracted into the opening 15. When not in use, the grip member 16 is taken out of the operating space 10 to allow the tyre 2 to overturn without interference.

The tyre 2 is further raised by the gripper and then overturned by 180° about the overturning axis Y by rotating the first grip element 25 and the second grip element 26. In particular, the second actuator 29 rotates the first grip element 25 and the tyre 2 while the second grip element 26 is driven in rotation by the tyre 2 itself. The rotation detector 30 verifies that the 180° rotation imparted by the second actuator 29 is that actually performed by the second grip element 26 and then by the tyre 2.

Once the overturning has been performed, the gripper with the tyre 2 are lowered and the grip member 16 is again raised to engage an opposite bead of the tyre 2 and lock the tyre 2. While the overturned tyre 2 is supported by the grip member 16, the first grip member 25 and the second grip member 26 are moved away from the radially outer portion of the tyre 2 and the gripper is raised again. At the same time, just before or shortly thereafter, the mechanical arm 38 returns the sensor 39 within the tyre 2 while the tyre 2 is in the raised position. Once the sensor 39 has been positioned and the mechanical arm 38 is stopped, the rotary device 19 is rotated by rotating the tyre 2 by about 370° while the sensor 39 executes second checks, in particular by means of a 3D optical scan, of a second half of the inner surface of the tyre 2, the auxiliary sensor 45 executes second checks, in particular by means of a 3D optical scan, of a second half of the outer surface of the tyre 2 and the bar code scanner 46 reads, if it has not done so previously, the bar code carried by the sidewall of the tyre 2 facing upwards.

At the end of the inspection of the second half of the tyre 2, the rotation is terminated, the sensor 39 is withdrawn and removed from the tyre 2, the grip member 16 is lowered and the projections 18 brought into the contracted position, so as to release the tyre 2 and rest it on the roller conveyor 9.

The roller conveyor 9 can therefore be started to cause the tyre 2 to exit from the outlet 12 and to let another tyre 2 to be checked enter.

The complete and low definition preliminary analysis performed in station 3 for checking tyres allows knowing with certainty the size and shape of the tyre 2 to prepare it for the high definition check downstream of said station 3.

The tyres 2 coming out one after the other from the station 3 for checking tyres 2, if suitable, are fed in succession in the first check unit 4 and then in the second check unit 5 where the high-definition checks are performed.

According to a process for checking tyres according to the present invention, a first half of each tyre 2 is checked by executing a plurality of high-definition checks along a first part of the check path corresponding to the first check unit 4, a second half of said tyre 2 is checked, after the overturning performed in the overturning and transport device 6, by performing the same plurality of high-definition checks along the second part of the check path corresponding to the second check unit 5.

If, following the first and second preliminary low-definition checks carried out in station 3, a tyre 2 is non-compliant, it is discarded without passing through the first check unit 4 and the second check unit 5, or causing it to transit but without executing the high definition checks as it could compromise the check tools of said first check unit 4 and second check unit 5.

In embodiments not shown, the station 3 for checking tyres according to the present invention is a stand-alone station, that is, it is not placed upstream of further check units and can be used, with appropriate sensors, to execute low-definition checks and/or high-definition checks. For example, one or more of the sensors described above may be integrated/replaced with sensors that allow the acquisition of high-definition images for the purpose of executing a high-definition check of the tyre 2.

The invention claimed is:

1. A station for checking tyres, comprising:
a support structure delimiting an operating space configured for receiving a tyre;
a checking device comprising a movable mechanical arm and at least one sensor associated with the movable mechanical arm, the at least one sensor being configured for inspecting, upon movement of the movable mechanical arm, an inner surface of the tyre housed in the operating space, wherein the movable mechanical arm is operatively active within the operating space and is configured for carrying the at least one sensor at least partially within the tyre housed in the operating space; and
an overturning device having grip elements configured for engaging a radially outer portion of the tyre, the overturning device being operative within the operating space and being configured for overturning the tyre around an overturning axis perpendicular to a rotation axis of the tyre while the tyre is situated in the operating space for inspection by the at least one sensor upon movement of the movable mechanical arm,
wherein the station is configured for
an inspection of a first half of the inner surface of the tyre before the overturning of the tyre by the overturning device, where the at least one sensor is moved a first time by the movable mechanical arm at least partially within the tyre, and
an inspection of a second half of the inner surface of the tyre after the overturning of the tyre by the overturning device, where the at least one sensor is moved a second time by the movable mechanical arm at least partially within the tyre.

2. The station as claimed in claim 1, wherein
the overturning device is a gripper comprising a first arm and a second arm movable in mutual approaching or moving apart; and
the grip elements comprise a first grip element situated on a respective end of the first arm and a second grip element situated on a respective end of the second arm.

3. The station as claimed in claim 2, wherein the grip elements are rotatable with respect to said first arm and second arm around the overturning axis.

4. The station as claimed in claim 3, wherein the gripper is movable along a direction parallel to the rotation axis of the tyre.

5. The station as claimed in claim 4, wherein
the first grip element is motorized for rotating around the overturning axis and the second grip element is free to rotate on the second arm; and
the gripper comprises a rotation detector operatively connected to the second grip element in order to detect the rotation thereof.

6. The station as claimed in claim 5, further comprising a grip member configured for engaging at least one bead of the tyre; the grip member being operative within the operating space and being configured for supporting the tyre in abutment against a sidewall while the tyre is situated in said operating space.

7. The station as claimed in claim 6, wherein the grip member comprises at least three projections parallel to a central axis thereof and movable between a contracted position, in which the at least three projections lie close together and close to said central axis, and a grip position, in which the at least three projections lie spaced from each other and equidistant from the central axis, in order to engage the bead of the tyre.

8. The station as claimed in claim 7, wherein the grip member is movable along its central axis.

9. The station as claimed in claim 8, wherein
the grip member comprises at least three support arms, each carrying a respective projection; and
the projections are movable along the arms between the contracted position and the grip position.

10. The station as claimed in claim 9, further comprising a rotary device carrying the grip member, the rotary device being configured for rotating the grip member around the central axis while the grip member is situated in said operating space.

11. The station as claimed in claim 10, further comprising an abutment plane for the tyre; wherein
said abutment plane is perpendicular to the rotation axis of the tyre and faces the operating space; and
the abutment plane is movable along an advancement direction perpendicular to the rotation axis of the tyre and perpendicular to the overturning axis.

12. The station as claimed in claim 11, wherein
the abutment plane has an opening configured for allowing the passage of the grip member; and
the grip member is movable between a rest position in which the grip lies retracted in the opening, and an operating position, in which it projects from the opening in order to engage the tyre.

13. The station as claimed in claim 12, wherein the mechanical arm of the checking device is movable along a direction parallel to the rotation axis of the tyre and along a direction perpendicular to the rotation axis of the tyre.

14. The station as claimed in claim 13, wherein the checking device comprises at least one auxiliary sensor mounted on the support structure for executing checks on an outer surface of the tyre housed in the operating space.

15. The station as claimed in claim 14, wherein the checking device comprises a code scanner mounted on the support structure.

16. The station as claimed in claim 14, wherein each of said at least one sensor and at least one auxiliary sensor is an image detector.

17. The station as claimed in claim 1, wherein
the support structure has an inlet for the tyre;
the station further comprises a measuring device placed at the inlet and configured for detecting a diameter and an axial size of the tyre; and
the measuring device comprises an emitter and a receiver configured for generating an optical barrier through the inlet.

18. The station as claimed in claim 11, wherein
the support structure comprises a frame having a lower portion configured for being set against the ground and an upper portion; and
the mechanical arm is constrained to the upper portion and is protruded towards the abutment plane, the operating space being delimited between the abutment plane and the upper portion.

19. An apparatus for checking tyres comprising:
the station as claimed in claim 1;
a first check unit having an inlet for the tyres and comprising a first plurality of checking tools;
a second check unit having an outlet for the tyres and comprising a second plurality of checking tools; and
an overturning and transport device operatively interposed between the first check unit and the second check unit,
wherein
the first check unit, the second check unit and the overturning and transport device define a check path configured so as to be traversed by pitches by each tyre,
the first check unit and the second check unit are configured for executing high-definition checks on at least respective halves of the tyres, and
said station is placed immediately upstream of the first check unit and is configured for executing a low-definition checking of the tyres before the entrance into the first check unit.

20. A station for checking tyres, comprising:
a support structure delimiting an operating space configured for receiving a tyre;
a checking device comprising a movable mechanical arm and at least one sensor associated with the movable mechanical arm, the at least one sensor being configured for inspecting, upon movement of the movable mechanical arm, an inner surface of the tyre housed in the operating space, wherein the movable mechanical arm is operatively active within the operating space and is configured for carrying the at least one sensor at least partially within the tyre housed in the operating space;
an overturning device having grip elements configured for engaging a radially outer portion of the tyre, the overturning device being operative within the operating space and being configured for overturning the tyre around an overturning axis perpendicular to a rotation axis of the tyre while the tyre is situated in the operating space for inspection by the at least one sensor upon movement of the movable mechanical arm, and
a grip member configured for engaging at least one bead of the tyre and lifting the tyre for inspection by the at least one sensor, the grip member being operative within the operating space and being configured for supporting the tyre in abutment against a sidewall while the tyre is situated in the operating space,
wherein the grip member comprises at least three projections parallel to a central axis thereof and movable between
a contracted position, in which the at least three projections lie close together and close to the central axis, and
a gripping position, in which the at least three projections lie spaced from each other and equidistant from the central axis, in order to engage the bead of the tyre.

* * * * *